United States Patent

Asada

[11] Patent Number: 5,760,354
[45] Date of Patent: Jun. 2, 1998

[54] COLLISION DETECTING APPARATUS AND METHOD OF ASSEMBLING COLLISION DETECTING APPARATUS

[75] Inventor: Satoshi Asada, Tokyo, Japan

[73] Assignee: Mitsubishi Denki Kabushiki Kaisha, Tokyo, Japan

[21] Appl. No.: 566,080

[22] Filed: Dec. 1, 1995

[30] Foreign Application Priority Data

Jan. 10, 1995 [JP] Japan ................... 7-001905

[51] Int. Cl.$^6$ .................................. H01H 35/14
[52] U.S. Cl. .................. 200/61.45 R; 200/61.53
[58] Field of Search .............. 200/61.45 R–61.45 M, 200/239, 241, 242, 275, 279, 282–284, 290; 73/1.37–1.39, 488, 514.01; 307/10.1, 116, 119, 120, 121; 340/669, 670

[56] References Cited

U.S. PATENT DOCUMENTS

| | | | |
|---|---|---|---|
| 3,096,411 | 7/1963 | Chabrek et al. | 200/61.53 |
| 3,571,539 | 3/1971 | Kaiser | 200/61.53 |
| 3,715,535 | 2/1973 | Urenda | 200/61.53 |
| 3,832,507 | 8/1974 | Marquardt et al. | 200/61.45 R |
| 4,210,789 | 7/1980 | Ushiku et al. | 200/61.45 R |
| 4,536,629 | 8/1985 | Diller | 200/61.45 R |
| 5,306,883 | 4/1994 | Manandhar et al. | 200/61.53 |
| 5,339,071 | 8/1994 | Eckhaus | 340/665 |
| 5,373,126 | 12/1994 | Manandhar et al. | 200/61.53 |
| 5,585,607 | 12/1996 | Kato et al. | 200/61.53 |

FOREIGN PATENT DOCUMENTS

| | | | |
|---|---|---|---|
| 422 819 | 4/1991 | European Pat. Off. | G01P 15/135 |
| 4257748 | 9/1992 | Japan | B60R 21/32 |

*Primary Examiner*—Michael L. Gellner
*Assistant Examiner*—Michal A. Friedhofer
*Attorney, Agent, or Firm*—Sughrue, Mion, Zinn, Macpeak & Seas, PLLC

[57] ABSTRACT

Extension means for extending a transmission path on which vibration transmitted through a movable contact to a contact element is provided for the collision detecting apparatus. Vibration generated when the vehicle is running is reduced before it reaches to the contact element. Consequently, variation of a space between a stationary contact and the movable contact is reduced, so that it is prevented that a characteristic of the apparatus changes.

30 Claims, 13 Drawing Sheets

FIG. 7
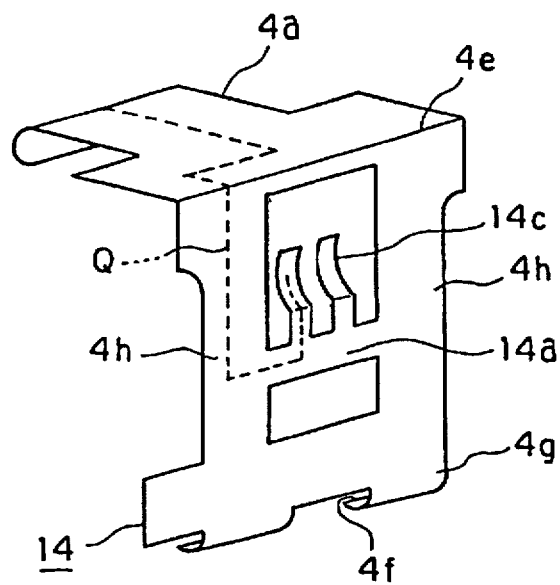
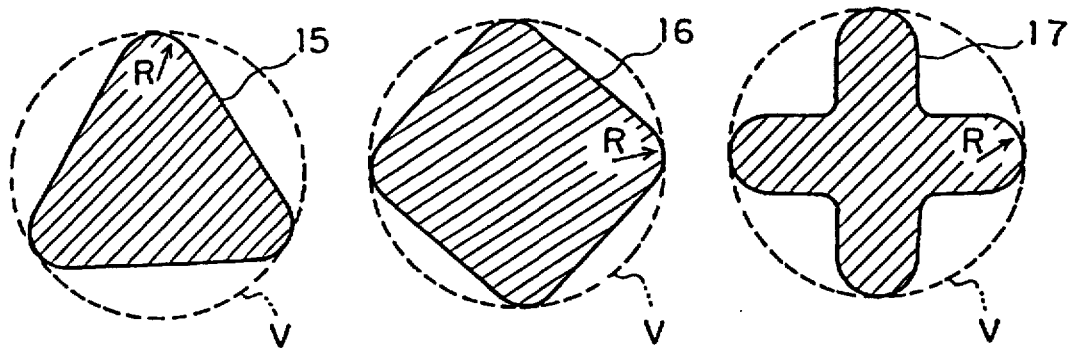
FIG. 8A     FIG. 8B     FIG. 8C

COLLISION DETECTING APPARATUS AND METHOD OF ASSEMBLING COLLISION DETECTING APPARATUS

BACKGROUND OF THE INVENTION

1. Field of the Invention

The present invention relates to a collision detecting apparatus to detect collision of a vehicle and so forth so as to, for example, actuate a passenger protecting apparatus such as air bag, and to a method of assembling the collision detecting apparatus.

2. Description of the Prior Art

In the prior art, there are known various types of collision detecting apparatuses to detect collision of a vehicle and so forth so as to output electric information to an air bag starting apparatus to start an air bag.

For example, in one collision detecting apparatus referred to as rolamite sensor and available from TRW Co., Ltd., a mass body is provided in a roller form, and is supported and pressed by a winding plate spring in one direction. In the rolamite sensor, the roller-type mass body is rotated in a direction opposed to a pressing direction in response to rapid deceleration caused at a time of collision of the vehicle, thereby turning ON a switch and starting the air bag.

As disclosed in Japanese Patent Publication (Kokai) No. 4-257748, there is also known another collision detecting apparatus in which a mass body for detecting the collision is not rotated as in the rolamite sensor but is linearly moved in one direction.

FIG. 21 is a perspective view showing such a conventional collision detecting apparatus which is generally used. In the drawing, reference numeral 101 means a mass body having predetermined mass, and 102 is a shaft to restrict a displacement direction of the mass body 101 to one direction, and slidably support the mass body 101. Reference numeral 103 means a coil spring to press the mass body 101 in one direction. 104 is a movable contact which is displaced while the movable contact following movement of the mass body 101, and 105 is a joint side terminal joined to the movable contact 104 so as to externally derive electric information. Reference numeral 106 means a stationary contact contacting the movable contact 104 for conduction when the mass body 101 is moved by a predetermined distance against pressing force of the spring 103, thereby deriving the electric information, and 107 is a stopper screwed to the shaft 102 so as to restrict an amount of movement of the mass body 101, and support the coil spring 103 from a single direction.

Further, reference numeral 108 means a pedestal to which the shaft 102, the joint terminal 105, and the stationary contact 106 are fixed, and the pedestal 108 includes a terminal 105a and a terminal 106a to externally output a signal. The terminal 105a is connected to the movable contact 104, and the terminal 106a is connected to the stationary contact 106. Reference numeral 109 means a cover forming a case together with the pedestal 108 so as to avoid entrance of external dust and so forth.

The collision detecting apparatus is mounted such that the stopper 107 is directed to the front side of a vehicle body.

A description will now be given of the operation. When high deceleration is caused in the vehicle due to collision and so forth, the mass body 101 receives inertia force caused by the deceleration. If the inertia force overcomes elastic force (spring set load) of the coil spring 103, the mass body 101 slidably moves on the shaft 102 toward the stopper 107 while compressing the coil spring 103.

In a normal state in which no collision occurs, a distal end 104c of the movable contact 104 is in contact with a supporting portion 101a extending from the mass body 101, and the movable contact 104 can have a function of the plate spring because of a warped beam portion 104a of the movable contact. Further, spring force of the beam portion 104a presses the movable contact 104 onto the supporting portion 101a. The movable contact 104 follows the movement of the mass body 101, that is, the movable contact 104 is elastically deformed in a direction to reduce an amount of warp in the beam portion 104a of the movable contact 104. When the amount of warp in the beam portion 104a of the movable contact 104 is reduced to a predetermined amount, a contact element 104b of the movable contact 104 contacts the stationary contact 106, thereby providing electric conduction between the joint side terminal 105 and the stationary contact 106.

A general collision detecting apparatus requires two characteristics including one time interval (a contact closing time) from occurrence of the deceleration to establish conduction between the joint side terminal 105 and the stationary contact 106, and another time interval (a contact closed duration) from establishment of the conduction between the joint side terminal 105 and the stationary contact 106 to loss of the conduction in response to the mass body returning to its original position.

In this case, it can be decided that, as the contact closing time is more reduced, the collision detecting apparatus has more superior response. Further, as the contact closed duration is more extended, the collision detecting apparatus causes less malfunction and becomes more reliable.

However, in the conventional collision detecting apparatus, the contact element 104b of the movable contact 104 has high rigidity so that the contact element 104b inadequately wipes across the stationary contact 106 when the contact element 104b contacts the stationary contact 106, thereby separating the contact element 104b from the stationary contact 106, resulting in possibility of malfunction of the apparatus.

Further, frictional force between the mass body 101 and the shaft 102 extends the contact closing time, resulting in deterioration of response of the apparatus.

Further, when the mass body 101 collides with the stopper 107, vibration generated by the collision is transferred to the movable contact 104 through tale shaft 102, thereby separating the contact element 104b of the movable contact 104 from the stationary contact 106, resulting in the malfunction.

Further, the movable contact 104 is deformed to displace a position in contact with the mass body 101, resulting in the malfunction.

Further, the mass body 101 is pressed by the movable contact 104 to be inclined with respect to the shaft 102.

In addition, the spring 103 is deviated from a predetermined position on the mass body 101 during assembly.

SUMMARY OF THE INVENTION

In view of the foregoing, it is an object of the present invention to provide a collision detecting apparatus in which malfunction hardly occurs, good response can be obtained, and operation can be ensured.

It is another object of the present invention to provide a collision detecting apparatus which can be easily constructed.

According to the present invention, for achieving the above-mentioned objects, there is provided a collision detecting apparatus including a mass body having predetermined mass, a shaft which supports the mass body while the mass body freely slides on the shaft along a predetermined axis direction of the shaft, a first stopper and a second stopper which support the shaft and stops the slide of the mass body at respective ends of the shaft, support means for supporting the first stopper and second stopper, actuation means located between the mass body and the first stopper, for actuating the mass body toward the second stopper, a stationary contact arranged on the second stopper, a movable contact whose one end is fixed to the second stopper and whose other end contacts with the mass body, the movable contact following a slide of the mass body, a contact element which is arranged on the movable contact and contacts with the stationary contact, and extension means for extending a transmission path of vibration transmitted to the contact element through the movable contact.

Vibration generated when a vehicle is running is transmitted to the contact element through the movable contact and vibrates the contact element. Owing to the vibration, a space between the contact element and the statinary contact varies. The variation of the space greatly effects a characteristic of the apparatus. That is, a period between an occurrence and a detection of a collision of the vehicle becomes longer as the space increases. On the contrary, when the space is narrow, a collision is determined in error in case a collision does not occur actually. The extension means extends the transmission path of vibration, which raises the problem, so as to reduce the vibration to solve the problem.

In one preferred mode, the extension means in the apparatus comprises a hole portion arranged on the transmission path of the vibration. The hole portion makes a detour of the transmission path of the vibration, and lowers stiffness of the movable contact and deforms the movable contact easily to suppress a transmission of swing at the tip of the movable contact to the contact element. In another preferred mode, the extension means includes a cut-raised portion formed on one side of the hole portion, and the contact element is arranged on the cut-raised portion. The extension means makes a further detour of the transmission path of the vibration. In addition, a spring constant of the contact element becomes to be smaller as it is cut-raised. In a further preferred mode, the extension means comprises a hole portion formed on the movable contact and a beam portion crossing over the hole portion, and the contact element is arranged on the beam portion. The extension means extends the transmission path of the vibration. The beam suppresses a transmission of swing at the movable contact to the contact element because the beam is easily deformed. In a further preferred mode, the extension means comprises the contact element formed such that the tip of the contact element is turned. The length of the contact element becomes to be longer to make a spring constant smaller because the tip of the contact element is folded. In addition, the turned portion contacts with the stationary contact smoothly as the portion wipes the contact.

In one preferred mode, the mass body includes a taper portion introducing the actuation means to the end of the mass body where the actuation means faces to the mass body. Consequently, the actuation means is easily introduced to desired place on the mass body.

Preferably, the collision detecting apparatus comprises resistance reduce means for reducing friction resistance between the mass body and the shaft. Consequently, a collision of a vehicle is quickly detected because the friction resistance between the mass body and the shaft is reduced.

In one preferred mode, the one end of the movable contact is holed by a plurality of components so as to be fixed to the second stopper. Consequently, the movable contact can be thinned without loss of contact strength. As a result, more preferably elasticity force is obtained.

In one preferred mode, the mass body has a wall portion formed around an external edge of the mass body on an end surface facing the second stopper. Consequently, this arrangement prevents harmful contact between the movable contact and the mass body on the side of the second stopper.

Preferably, the first stopper is supported in the support means by means of press fitting. Consequently, a construction process of the collision detecting apparatus is simplified.

Preferably, a vibration absorbing component is provided with on the surface of the movable contact so as to reduce vibration transmitted through the movable contact.

In one preferred mode, there is provided a collision detecting apparatus includes prevention means for reducing moving distance of the movable contact when the mass body collides with the second stopper to prevent plasticity transformation of the movable contact. When the mass body moves to the second stopper, the mass body lets the movable contact move to the same direction. The prevention means prevents the movable contact to be limitlessly deformed plastically.

Preferably, the movable contact is formed so that the another end contacts to the second stopper and predetermined bend quantity is provided with by actuating force from the actuation means after the one end is fixed to the second stopper. Consequently, it is prevented that the movable contact is plastically deformed while it is constructed.

In another preferred aspect of the present invention, there is provided a collision detecting apparatus including a mass body having predetermined mass, a shaft which supports the mass body while the mass body freely slides on the shaft along a predetermined axis direction of the shaft, a first stopper and a second stopper which support the shaft and stop a slide of the mass body at respective ends of the shaft, support means for supporting the first stopper and the second stopper, actuation means located between the mass body and the first stopper, for actuating the mass body toward the second stopper, a stationary contact arranged on the second stopper, a movable contact whose one end is fixed to the second stopper and whose another end contacts with the mass body, the movable contact following a slide of the mass body, a contact element which is arranged on the movable contact and contacts with the stationary contact, and vibration prevention means for preventing vibration generated when the mass body collides with the first stopper. When the mass body collides to the first stopper, the stationary contact contacts with the contact element and the contact point is closed. On the contrary, vibration generated by a collision of the mass body and the first stopper is transmitted from the first stopper to the stationary contact through the shaft and the second stopper, for example. The vibration causes chattering at closed contact point. However, the vibration prevent means prevent the vibration, which causes such a problem, so as to reduce the chattering at closed contact point. In one preferred mode, the vibration prevention means is realized by the first stopper made of elastic material. The elastic first stopper softens the collision of the mass body and the first stopper to prevent the vibration. In another preferred mode, the vibration prevention means comprises an elastic buffer member formed on the first stopper or on the first stopper side of the mass body.

The elastic buffer member softens the collision of the mass body and the first stopper to prevent the vibration. In a further preferred mode, the vibration prevention means is formed of the actuation means having a load characteristic of non-linear monotone increase function where an increase ratio of the load becomes larger as the actuation means is compressed. The load of the actuation means is small near the second stopper and is large near the first stopper. Consequently, the vibration by the collision of the mass body and the first stopper is reduced without a fall of responsibility of the apparatus. In a still further preferred mode, the vibration prevention means comprises a cylindrical housing component which is arranged at a predetermined interval with the mass body, and one end of the housing component is contact with the first stopper. In this construction, the force by pressure variation of air in the cylindrical housing component functions to prevent movement of the mass body. Thus, the force functions to prevent collision to reduce the vibration when the mass body collides to the first stopper. When the mass body leaves from the first stopper, the force functions to prevent the mass body to move, so that a period under closed condition of the contact point is lengthened.

BRIEF DESCRIPTION OF THE DRAWINGS

FIG. 7 is a perspective view showing still another movable contact in another embodiment of the collision detecting apparatus of the present invention;

FIG. 8 is sectional views showing shafts on which a mass body slides in another embodiment of the collision detecting apparatus of the present invention;

DETAILED DESCRIPTION OF THE PREFERRED EMBODIMENTS

Figure 1:
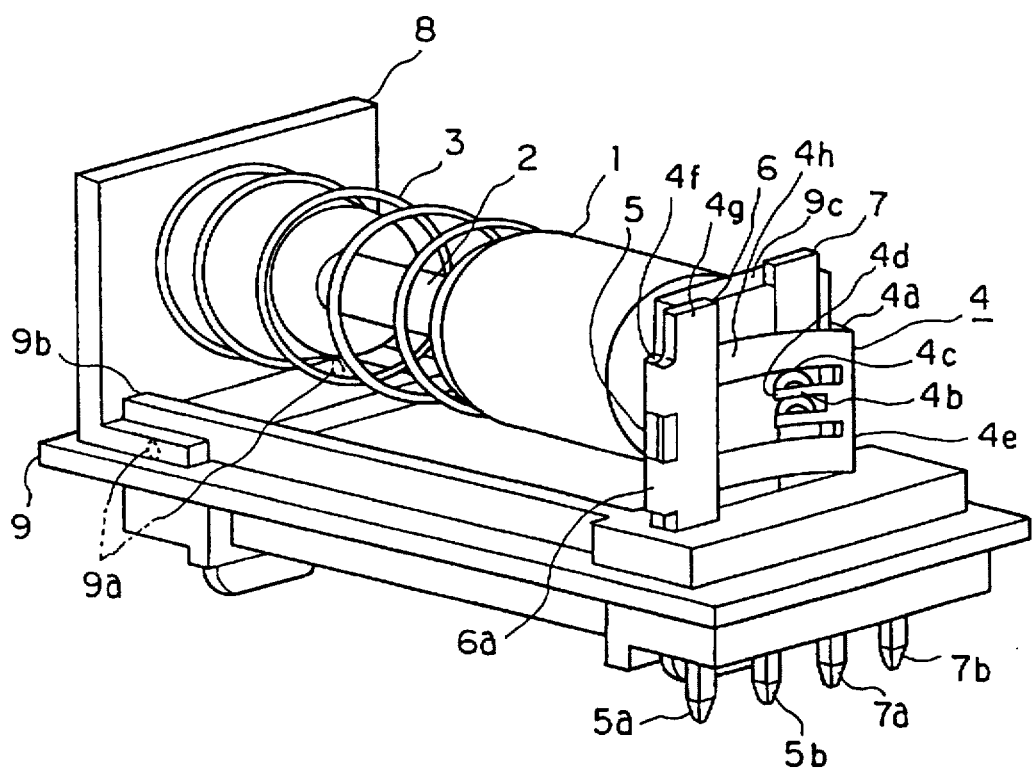
FIG. 1 is a perspective view showing one embodiment of a collision detecting apparatus of the present invention.
Figure 2A:
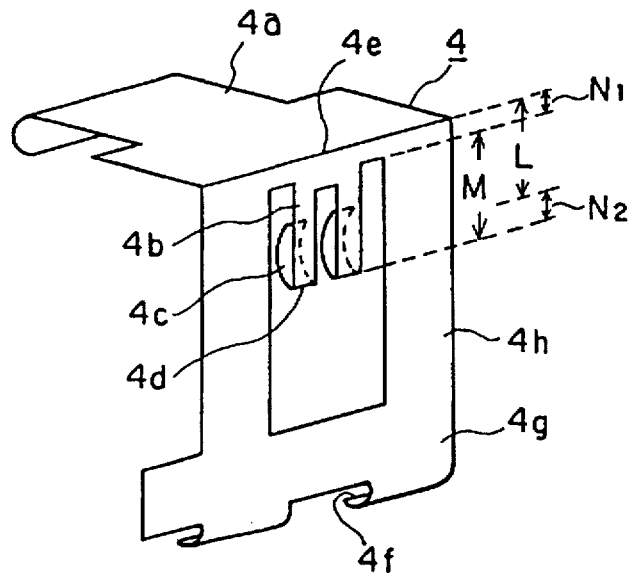
FIG. 2(a) is a perspective view showing a movable contact in the embodiment shown in FIG. 1.
Figure 3:
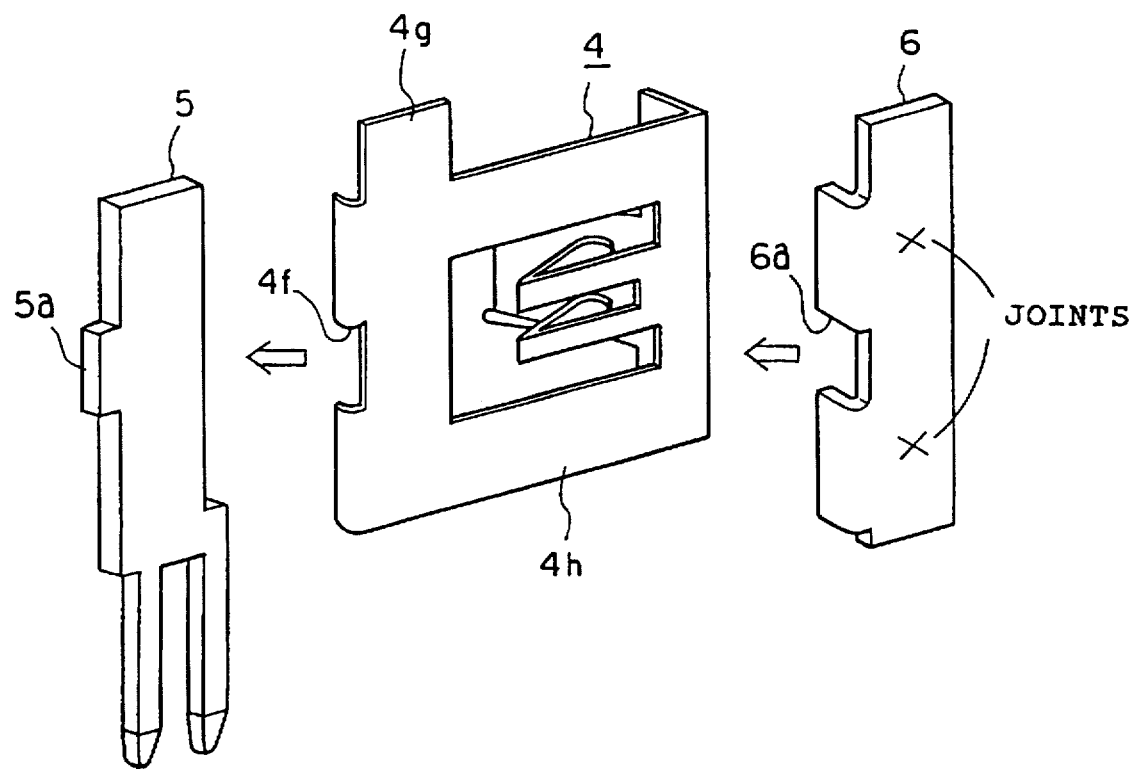
FIG. 3 is a perspective view showing a method of fixing a movable contact in FIG. 2.
Figure 4:
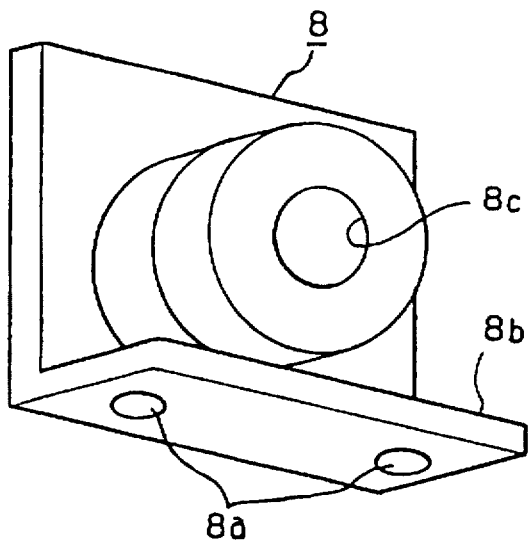
FIGS. 4(a) to 4(d) are perspective views respectively showing a stopper and a pedestal in the embodiment shown in FIG. 1.
Figure 4:
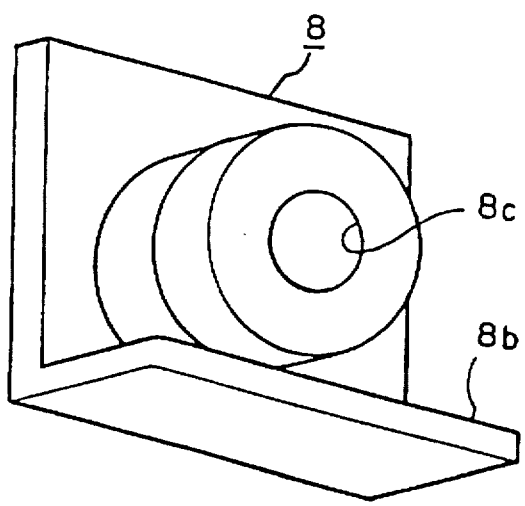
Figure 4:
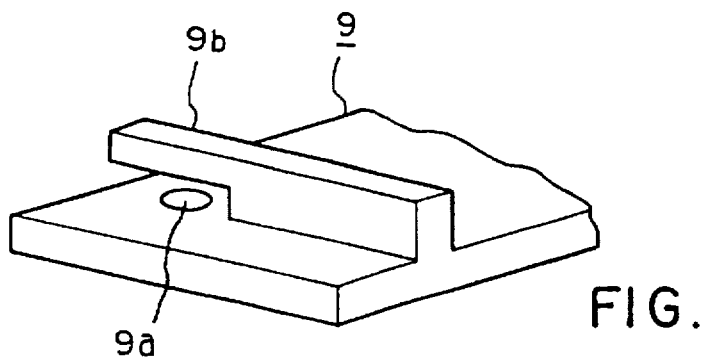
Figure 4:
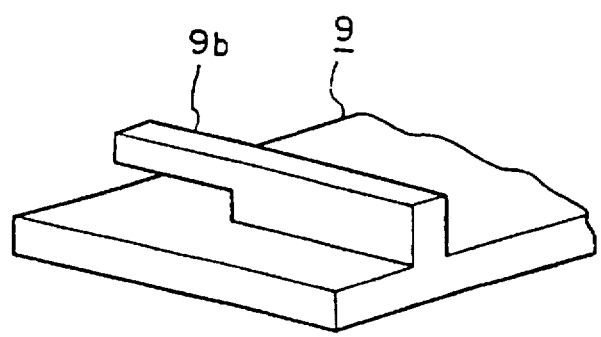

FIG. 1 is a perspective view showing one embodiment of a collision detecting apparatus of the present invention. FIG. 2 is a perspective view showing a movable contact 4, and FIG. 3 is a perspective view showing a method of fixing the movable contact 4. FIGS. 4(a) and 4(b) are perspective views respectively showing a stopper 8 and a pedestal 9.

In the drawings, reference numeral 1 means a cylindrical mass body having predetermined mass. Reference numeral 2 means a shaft passing through an intermediate portion of the mass body 1 to slidably support the mass body 1 while restricting a direction of movement of the mass body 1 to an axial direction. Reference numeral 3 means a coil spring as an actuation means pressing the mass body 1 in one direction. Reference numeral 4 means the L-type movable contact including a supporting portion 4a to contact an end surface of the mass body 1 so as to be displaced while following the movement of the mass body 1, and a contact element 4b to contact a stationary contact 7 (which will be discussed infra). Further, the contact element 4b is once folded at a folded portion 4d, and contacts the stationary contact 7 (described below) at a contact portion 4c. The movable contact 4 can be curved to form a curved portion 4h, and one end of the curved portion 4h is fixed to a joint side terminal 5 (described below) at a joint portion 4g. Reference numeral 5 means the joint side terminal which is joined to the movable contact 4 through laser beam welding and so forth, and is electrically connected to the outside through terminal portions 5a and 5b downward extending from the apparatus. It is thereby possible to externally derive electric information.

Reference numeral 6 means a joint plate, and the movable contact 4 is fixed and reinforced between the joint plate 6 and the joint side terminal 5. The terminal 5 and the plate 6 constructs a plurality of components. Reference numeral 7 means the stationary contact for contacting the contact element 4b of the movable contact 4 which is displaced according to the mass body 1 when the mass body 1 is moved by a predetermined amount against pressing force of the coil spring 3. The stationary contact 7 is electrically connected to the outside through terminals 7a and 7b downward extending from the apparatus. Thus, the electric information can be conducted when the stationary contact 7 contacts the contact element 4b. Reference numeral 8 means a stopper serving as a first stopper to support one end of the coil spring 3 and restrict an amount of movement of the mass body 1. Reference numeral 9 means a pedestal as a support means to which the joint side terminal 5, the stationary contact 7, and the stopper 8 are fixed. The pedestal 9 is combined with an unillustrated cover to form a case for protecting the apparatus therein. Reference numeral 9c means a stop portion serving as a second stopper to stop the mass body 1 in a direction opposed to a direction of urging force by the coil spring 3. The stationary contact 7 and the joint side terminal 5 are fixed to the stop portion 9c which is molded integrally with the pedestal 9.

A description will now be given of the operation.

When a vehicle normally travels, the mass body 1 is pressed by elastic force of the coil spring 3 to the side of the stationary contact 7. Hence, in the movable contact 4, the supporting portion 4a is pressed by the mass body 1 to curve the curved portion 4h, thereby separating the contact portion 4c from the stationary contact 7, resulting in a non-contact state. Therefore, electrical connection is lost between the joint side terminal 5 and the stationary contact 7 so that no electric information is conducted. Since collision of the vehicle can be detected depending upon the conduction of the electric information, this state can be regarded as a normal state in which the vehicle does not come into collision.

On the other hand, at a time of collision of the vehicle, the slidably supported mass body 1 receives inertia force greater than the elastic force of the coil spring 3, and is moved to the side of the stopper 8. Consequently, the movable contact 4 returns to its original form by elastic force of the curved portion 4h, and the contact portion 4c contacts the stationary contact 7, thereby establishing the electric connection between the joint side terminal 5 and the stationary contact 7. As a result, the electric information can be conducted so that the collision of the vehicle can be detected.

As set forth above, the movable contact 4 controls a switching operation between the vehicle joint side terminal 5 and the stationary contact 7 according to displacement of the mass body 1. It is thereby possible to detect whether or not the vehicle comes into collision.

A detailed description will now be given of the movable contact 4. FIG. 2 is a perspective view showing the movable contact 4. In FIG. 2, reference numeral 4c means the contact portion which is in contact with the stationary contact 7 when the contact element 4b of the movable contact 4 contacts the stationary contact 7. Typically, it is necessary to provide a predetermined distance or more between the contact portion 4c and the stationary contact 7 so as to avoid malfunction. If the contact portion 4c is mounted closer to a supporting portion bending position 4e, that is, if the contact portion 4c is mounted more apart from the joint portion 4g, it is possible to provide the predetermined distance or more between the contact portion 4c and the stationary contact 7 even when the curved portion 4h has a small amount of curve. Consequently, a shorter distance (shown by L in FIG. 2) is preferably provided between the contact portion 4c and the supporting portion bending position 4e.

On the other hand, as a length (shown by M in FIG. 2) of the contact element 4b is more extended, the contact element 4b can have a lower spring constant with respect to the movable contact 4, that is, the contact element 4b can more easily be deformed (displaced) with respect to the movable contact 4. Hence, it is possible to more easily absorb impact caused when the contact portion 4c contacts the stationary contact 7. The absorption of impact prevents the contact portion 4c from separating from the stationary contact 7, thereby improving a contact performance and a wiping performance of the contact element 4b.

As shown in FIG. 2, it is preferable to provide the shortest possible length L, and the longest possible length M. Accordingly, it can be seen that a length N1 should be reduced, and a length N2 should be extended.

In this case, the contact element 4b is operated to wipe in a lateral direction after the contact element 4b contacts the stationary contact 7, that is, the contact 4b serves as a wiping contact. The "wiping performance" means a performance of the wiping contact.

Since the contact element 4b is folded at the folded portion 4d, the contact portion 4c can more easily be deformed, and can more easily absorb the impact, thereby providing more stable contact and considerably improving the wiping performance. Further, since the contact element 4b is folded at the folded portion 4d, the length M is more extended by adding a folded length even when the contact portion 4c is at a constant position. Vibration is more rarely transferred, thereby providing more stable contact at a contact point and considerably improving the wiping performance.

Figure 2B:
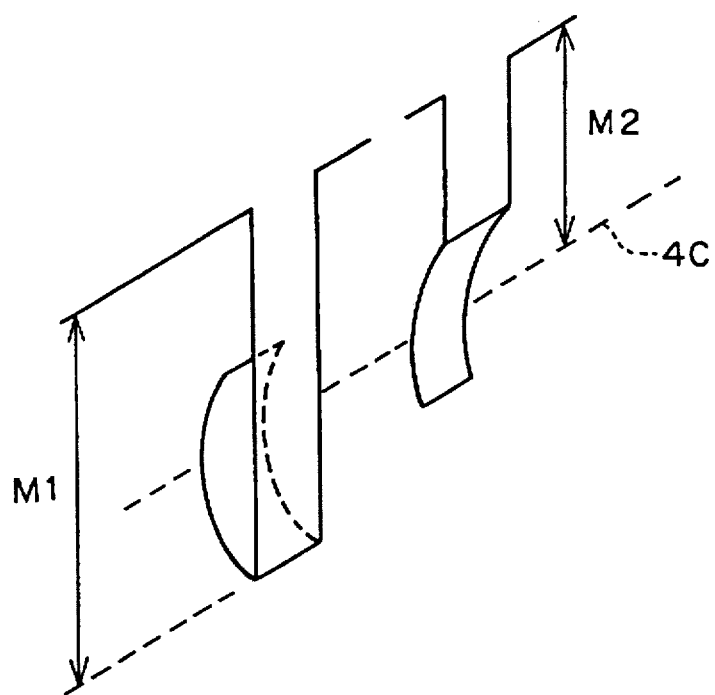
FIG. 2(b) is an enlarged view of a contact element.

FIG. 2(b) shows the above functions. As shown in FIG. 2(b), in case the contact element 4b contacts with the stationary contact 7 at the contact portion 4c, the length M1 of the contact element 4b formed when the tip of the contact element 4b is folded is longer than the length M2 formed when the tip of the contact element 4b is not folded. Consequently, the contact element 4b whose tip is folded has a lower spring constant as the length becomes to be longer. As a result, the contact element 4b is difficult to vibrate. In addition, vibration is difficult to be transmitted since the transmission path of the vibration is longer as the length becomes to be longer. Here, the contact element 4b whose tip is folded realized extension means for extending the transmission path of the vibration.

A detailed description will now be given of joint of the movable contact 4.

FIG. 3 is a perspective view showing the joint of the movable contact 4. Three parts including the joint side terminal 5, the movable contact 4, and the joint plate 6 are superimposed according to the arrows in the drawing such that a notched portion 4f in the movable contact 4 and a notched portion 6a in the joint plate 6 are positioned at the positioning portion 5a extending from the joint side terminal 5. In the superimposed state, spot welding or laser beam welding is carried out. In this case, the movable contact 4 is thin-walled to provide elasticity, and the movable contact 4 is interposed and joined between the thick-walled joint side terminal 5 and the thick-walled joint plate 6. It is thereby possible to avoid reduction of material strength of the joint portion 4g of the movable contact 4 due to the joint, and improve joint strength. As a result, it is possible to eliminate disadvantages in that, for example, the movable contact 4 is deformed at the joint portion 4g to cause the malfunction of the apparatus, and the movable contact 4 is broken at the joint portion 4g.

In addition, the movable contact 4 is not deviated from a correct position at the joint portion 4g.

A description will now be given of a method of fixing the stopper 8 to the pedestal 9.

FIG. 4(a) is a perspective view of the stopper 8, and 4(b) is a partial perspective view of the pedestal 9. In the drawings, two projecting portions 8a extend from the stopper 8 at a surface opposed to the pedestal 9. Further, the pedestal 9 is provided with recesses 9a (or through-holes instead of the recesses 9a) into which the projecting portions 8a are inserted, and a leg portion 9b by which the stopper base 8b is held.

A description will now be given of the operation. When the stopper base 8b is fitted into the leg portion 9b, the leg portion 9b has a so-called snap-fit function. That is, when the projecting portion 8a is once fitted into the recess 9a in the pedestal 9, the leg portion 9b can prevent the stopper 8 from dropping off. Thus, it is possible to eliminate the need for discretely preparing additional screws and so forth. Further, since the stopper 8 can be mounted by simply inserting the stopper base 8b, assembly of the apparatus can be more facilitated.

As well as the above embodiment, it is possible to provide many other modifications of the movable contact 4.

FIGS. 4(c) and 4(d) show examples of the modifications. As shown in the drawings, it is acceptable that the projecting portion 8a and the recess 9a disappear on the stopper 8 and the pedestal 9. The stopper 8 and the pedestal 9 are constructed by means of press fitting. If the stopper 8 and the pedestal 9 are simply formed as above, the construction process is simplified.

Figure 5:
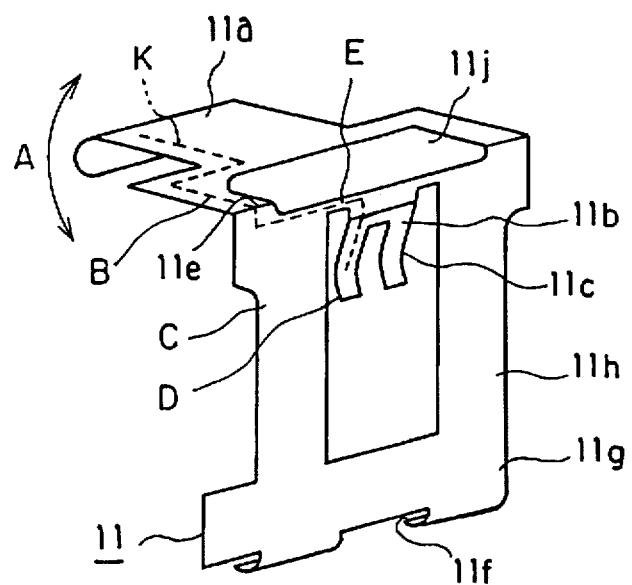
FIG. 5 is a perspective view showing a movable contact in another embodiment of the collision detecting apparatus of the present invention.

FIG. 5 is a perspective view showing a movable contact 11. In FIG. 5, reference numeral 11 means a movable contact, 11a is a supporting portion equivalent to the supporting portion 4a in the first embodiment, 11b is a contact element including a contact portion 11c to contact a stationary contact 7, 11e is a supporting portion bending position serving as a bent edge at which the movable contact 11 is bent, 11f is a notched portion which is combined with a joint side terminal 5, 11g is a joint portion fixedly interposed between the joint side terminal 5 and a joint plate 6, 11h is a curved portion, and 11j is a bored hole as a hole portion formed by boring an area including a part of the supporting portion bending position 11e.

As set forth above, since the bored hole 11j is provided on the transmission path of the vibration transmitted to the contact element though the movable contact 11, it is possible to further extends the transmission path (shown by the broken line K in the drawing) through which displacement (or vibration) of a distal end of the supporting portion 11a is transferred to the contact element 11b. In particular, the transmission path K bypasses the bored hole 11j as shown by mark B on the transmission path K in FIG. 5. Further, the bored hole 11j reduces rigidity of the supporting portion bending position 11e so that the displacement (or the vibration) caused at the supporting portion 11a can be absorbed on the way of the transmission path K. Hence, the displacement (or the vibration) is more rarely transferred to the contact element 11b. Therefore, even when a mass body 1 is finely vibrated on a shaft 2 due to vibration of a vehicle during normal travel of the vehicle, the vibration can be absorbed before the vibration is transferred to the contact element 11b. As a result, the contact element 11b never contacts the stationary contact 7 inadvertently.

When the mass body 1 presses the movable contact 11, frictional force is applied between a supporting surface of the mass body 1 and the distal end of the supporting portion 11a of the movable contact 11. The frictional force can position the distal end of the supporting portion 11a of the movable contact 11 on the supporting surface of the mass body 1. Thus, the position of the distal end of the supporting portion 11a may be deviated as shown by the arrow A, resulting in unstable positioning. However, the bored hole 11j is provided to curve the curved portion 11h, vary a bent angle at the supporting portion bending position 11e, and more easily curve the supporting portion 11a. As a result, even when the distal end of the supporting portion 11a is deviated from its original position, a position of the contact element 11b with respect to the stationary contact 7 is more rarely varied.

Figure 6:
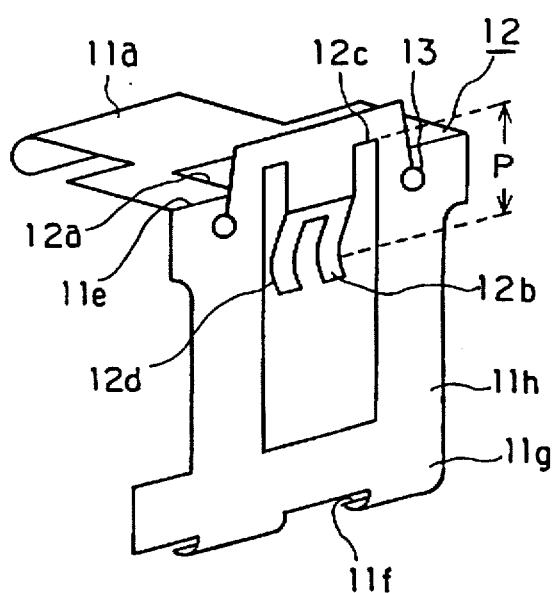
FIG. 6 is a perspective view showing another movable contact in another embodiment of the collision detecting apparatus of the present invention.

FIG. 6 is a perspective view showing another modification of the movable contact. As shown in the drawing, the movable contact 12 includes a cut-raised portion formed such that an intermediate portion of a supporting portion 11a is cut and raised. That is, when the movable contact 12 is bent at a supporting portion bending position 11e to provide an L-type form, a root portion 12c of the contact 12b is left unfolded, resulting in a cut-raised state. The cut-raised portion is located at one side of the bored hole. Thus, as compared with the movable contact 11 shown in FIG. 5, the movable contact 12 can be provided with a longer distance P from the root position 12c of the contact 12b to a contact portion 12d for contacting a stationary contact 7. It is thereby possible to improve a wiping performance of the contact element 11b.

Further, as in the movable contact 11 shown in FIG. 5, the movable contact 12 can also be provided with a longer displacement transmission distance from the distal end of the supporting portion to the contact, resulting in a stable position of the contact.

In the embodiment, reference numeral 13 means a hole provided to buffer stress concentration at the cut-raised portion of the movable contact 12.

FIG. 7 is a perspective view showing another modification of the movable contact.

In FIG. 7, a movable contact 14 is provided with a middle beam 14a as a beam portion extending from middle positions of two curved portions 4h and crossing a hole portion in the movable contact 14 to connect the two curved portions 4h. The two curved portions 4h are formed by the hole portion made at a center portion of the movable contact 14. Further, the middle beam 14a includes a contact element 14c. It is possible to more extend a transmission path Q (shown by the broken line in FIG. 7) between a supporting portion 4a and the contact element 14c by the middle beam 14b including the contact element 14c. As a result, the contact element 14c of the movable contact 14 can more rarely be affected by the operation of the supporting portion 4a. A structure and an operation other than the above discussion are identical with those in the first embodiment, and descriptions thereof are omitted.

A description will now be given of another embodiment of the collision detecting apparatus of the present invention. The embodiment relates to improvement of the shaft.

FIG. 8 is sectional views showing sectional forms of shafts on which the mass body slides in the embodiment. A shaft 15 has a substantially regular triangular section, a shaft 16 has a substantially square section, and a shaft 17 has a cross-type section. In the respective sections, corner portions are rounded to have curvature of R. Further, the broken lines V mean circles showing inner diameters of a mass body 1. The shafts 15, 16 and 17 realize resistance reduce means for reducing friction resistance between the mass body and the shaft respectively.

The sectional forms can reduce contact areas between the mass body 1 and the respective shafts. Consequently, it is possible to reduce frictional resistance between the mass body 1 and any one of the shafts when the mass body 1 is slid on the shaft. Hence, the mass body 1 can rapidly be moved at a time of collision of a vehicle, and the collision can rapidly be detected.

Further, since the mass body 1 is in contact with the shaft 15, 16, or 17 through at least three corner portions, the mass body 1 is never deviated from the shaft, and no chattering is produced. A structure and an operation other than the above discussion are identical with those in the first embodiment, and descriptions thereof are omitted.

A description will now be given of another embodiment of the collision detecting apparatus of the present invention. In the embodiment, the collision detecting apparatus includes an impact buffer member as vibration prevention means provided for a stopper.

In the first embodiment shown in FIG. 1, the stopper 8 is made of industrial plastic such as PBT having a low impact/vibration damping performance. However, in the embodiment, the stopper 8 is made of elastic body such as rubber, or material, such as thermoplastic elastomer also serving as the elastic body, having a high impact/vibration damping performance.

As described above, the stopper 8 is made of the material having the high impact/vibration damping performance. Thus, when the mass body 1 collides with the stopper 8, vibration caused by the collision never vibrates a movable contact 4 and never separates the movable contact 4 from a stationary contact 7.

Figure 9:
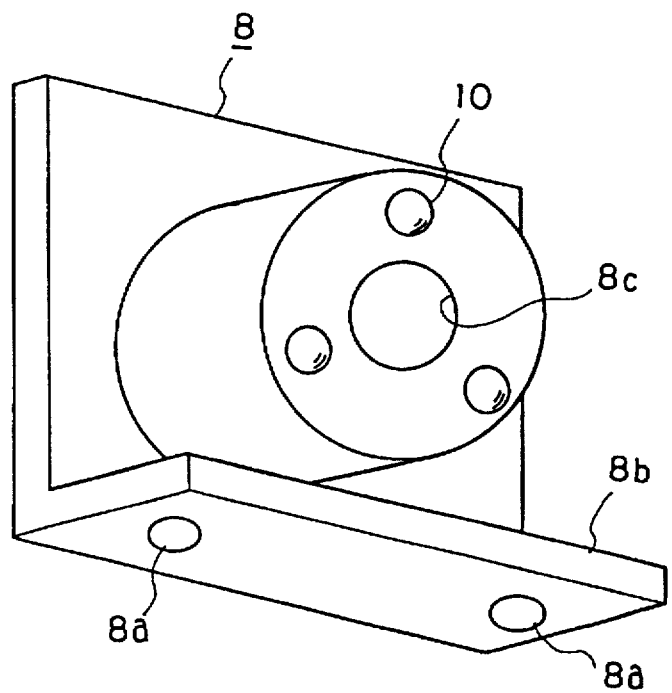
FIG. 9 is a perspective view showing a stopper in another embodiment of the collision detecting apparatus of the present invention.

FIG. 9 is a perspective view showing a stopper in another embodiment of the collision detecting apparatus of the present invention. In FIG. 9, a projection 10 as a buffer member is made of an impact absorbing member such as elastic body to damp or absorb the vibration caused by the collision with the mass body 1. Further, the projection 10 is additionally provided for the stopper 8 at a surface opposed to the mass body 1, thereby damping and absorbing the impact or the vibration.

In the embodiment, a structure is provided as described above. At a time of collision of the vehicle, that is, when relatively high deceleration is applied to the collision detecting apparatus, the mass body 1 may be largely moved. However, even when the mass body 1 comes into contact or collision with the stopper 8, the impact or vibration due to the collision is not transferred from the stopper 8 to a shaft 2 and so forth. It is thereby possible to damp or absorb the impact or vibration, and avoid chattering of a movable contact at which the contact point is closed.

Furthermore, while not shown in FIG. 9, a projection like projection 10 above may extend from a surface of the stop portion 9c in the first embodiment. Here, the projection 10 formed at the surface of the stop portion 9c realizes prevention means for reducing moving distance of the movable contact by softening impact generated when the mass body 1 collides with the stop portion 9c to prevent plasticity transformation of the movable contact. A structure and an operation other than the above discussion are identical with those in the first embodiment, and descriptions thereof are omitted.

Though the stopper 8 includes the impact absorbing member in the embodiment, a mass body may include the impact absorbing member as an elastic buffer member.

Figure 10:
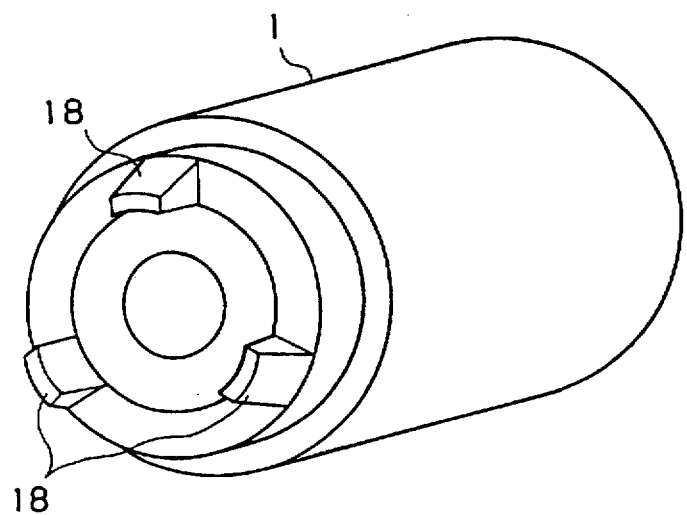
FIG. 10 is a perspective view showing a mass body in another embodiment of the collision detecting apparatus of the present invention.

FIG. 10 is a perspective view showing a mass body in another embodiment of the collision detecting apparatus having such a structure. In FIG. 10, projections 18 as buffer members are made of elastic body or impact/vibration absorbing material, such as thermoplastic elastomer also serving as the elastic body. Further, the additional projections 18 extend from the mass body 1 at a surface opposed to a stopper 8.

In the collision detecting apparatus, application of relatively high deceleration largely moves the mass body 1 so that the mass body 1 may contact or collide with the stopper 8. However, in this case, the projections 18 can absorb collision/vibration energy while the projections 18 being compressed. Thus, vibration due to the collision never vibrates a movable contact 4, never separates the movable contact 4 from a stationary contact 7, and causes no chattering. A structure and an operation other than the above discussion are identical with those in the first embodiment, and descriptions thereof are omitted.

A description will now be given of another embodiment of the collision detecting apparatus of the present invention. The embodiment relates to improvement of the coil spring 3 in the first embodiment.

Figure 11:
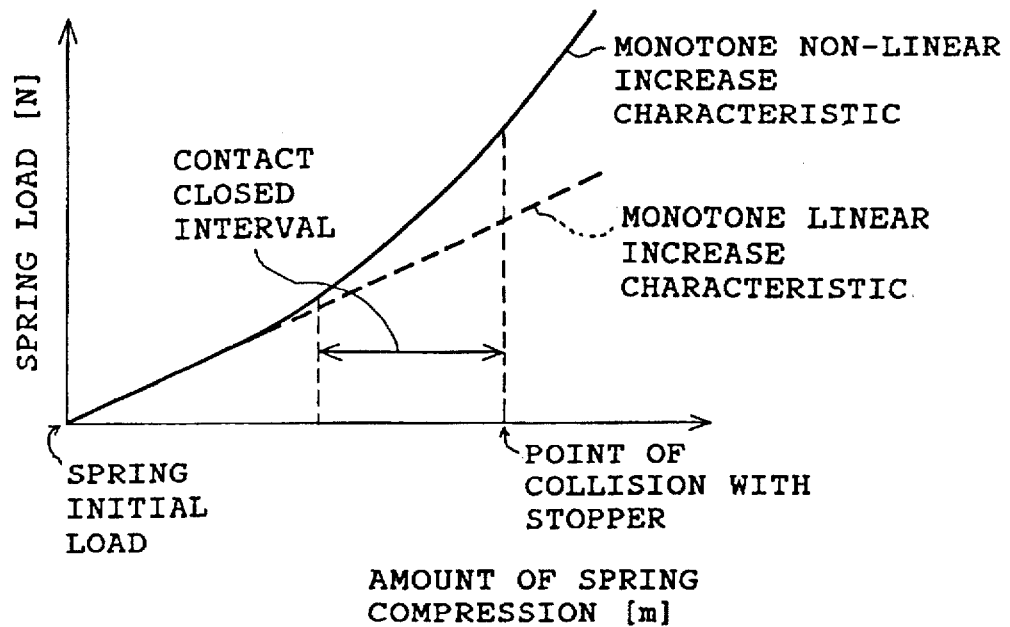
FIG. 11 is a graph diagram showing a relationship between spring load and an amount of spring compression of a coil spring in another embodiment of the collision detecting apparatus of the present invention.

FIG. 11 is a graph diagram showing a spring load-amount of spring compression characteristic of one spring having a monotone non-linear increase characteristic and another spring having a monotone linear increase characteristic. As shown in FIG. 11, the spring loads of both the springs gradually increase according to an increase in the amount of spring compression. When the amount of spring compression is constant with respect to an initial load, higher spring load at a time of compression can be observed in the spring showing the monotone non-linear increase characteristic than in the spring showing the monotone linear increase characteristic.

In this case, force applied to the mass body 1 mainly includes the spring load of the coil spring 3, inertia force caused by the deceleration due to the collision of the vehicle, and reaction force from a movable contact. As the spring load becomes higher, the inertia force by the deceleration has smaller effect on the mass body 1. Consequently, impact force applied to a stopper 8 can be made smaller. However, when spring initial load is made higher in order to provide higher spring load, the mass body 1 can not easily be operated. Alternatively, when a spring constant is made higher, that is, when the solid line is more steeply inclined in the graph of FIG. 11, a contact closed duration is more reduced, thereby causing a problem in that required characteristics can not be ensured. Accordingly, as in the spring as actuation means having the monotone non-linear increase characteristic shown in FIG. 11, a low spring constant may be held when a contact is closed, and a rapidly large spring constant may be provided in the vicinity of the stopper. It is thereby possible to reduce the impact force applied to the stopper and avoid chattering of the movable contact without almost the entire effect on the contact closed duration.

A spring coil having the above characteristics can be provided by, for example, varying a diameter of a spring coil, or varying number of turns of the spring coil. A structure and an operation other than the above discussion are identical with those in the first embodiment, and descriptions thereof are omitted.

Figure 12:
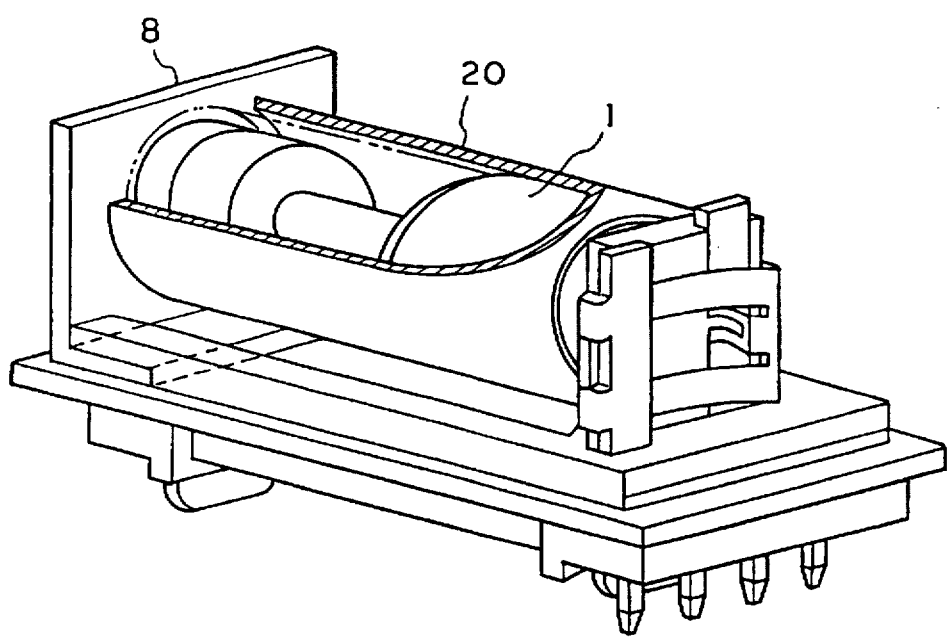
FIG. 12 is a partially broken perspective view showing another embodiment of the collision detecting apparatus of the present invention.

In one preferred mode, instead of the above coil spring, a cylindrical housing 20 as a housing component may additionally be provided to form a sufficiently small clearance between the housing 20 and an outer periphery of a mass body 1. FIG. 12 is a partially broken perspective view of another embodiment of the collision detecting apparatus having such a structure. A space between the stopper 8 and the housing 20 is sealed such that no air in the cylindrical housing 20 leaks from the side of the stopper of the housing 20. Further, it must be noted that the movable contact side of the housing 20 is left opened.

When deceleration is applied to the collision detecting apparatus, the mass body 1 is displaced toward the stopper 8 while the air being compressed between the mass body 1 and the stopper 8 in the housing 20. In this case, the compressed air escapes little by little from a slight gap between the housing 20 and the mass body 1. The compressed air applies force in a direction to interfere with movement of the mass body 1, and serves to damp impact force applied to the stopper 8. It is thereby possible to avoid chattering of a movable contact.

Further, when the mass body 1 returns to its original position by elastic force of a coil spring 3, the mass body 1 moves to increase the volume after the compressed air escapes. Thus, negative pressure is applied in a direction to prevent the mass body from returning to the original position, resulting in a more extended contact closed duration. A structure and an operation other than the above discussion are identical with those in the first embodiment, and descriptions thereof are omitted.

Figure 13:
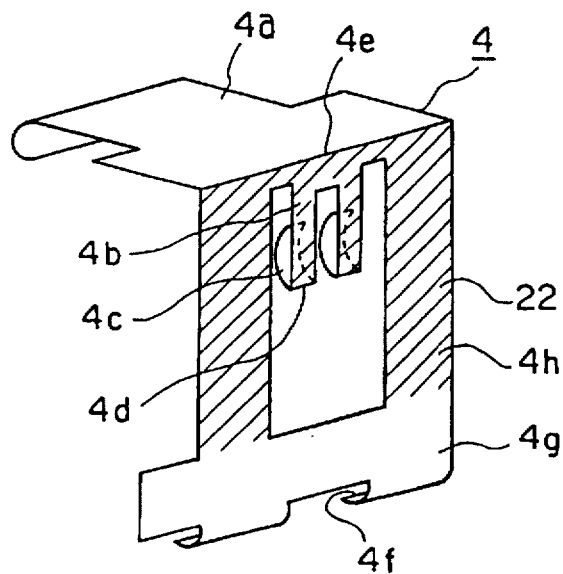
FIG. 13 is a perspective view showing a movable contact in another embodiment of the collision detecting apparatus of the present invention.

A description will now be given of another embodiment of the collision detecting apparatus of the present invention. In the collision detecting apparatus in the embodiment, a vibration absorbing rubber is applied or burned onto a movable contact 4. FIG. 13 is a perspective view showing the movable contact in the embodiment. In the drawing, reference numeral 22 means the vibration absorbing rubber applied onto the movable contact 4. In FIG. 13, a shaded portion means a position at which the rubber 22 is applied. The rubber 22 is an example of a vibration absorbing component.

In the embodiment, vibration transferred to a supporting portion 4a or a joint portion 4g can be damped or absorbed by the applied vibration absorbing rubber 22 before the vibration is transferred to a contact element 4b. Thus, no chattering is produced in the contact element 4b. A structure and an operation other than the above discussion are identical with those in the first embodiment, and descriptions thereof are omitted.

A description will now be given of another embodiment of the collision detecting apparatus of the present invention. The collision detecting apparatus in the embodiment can be obtained by providing a barrier plate for the collision detecting apparatus described in the first embodiment.

Figure 14:
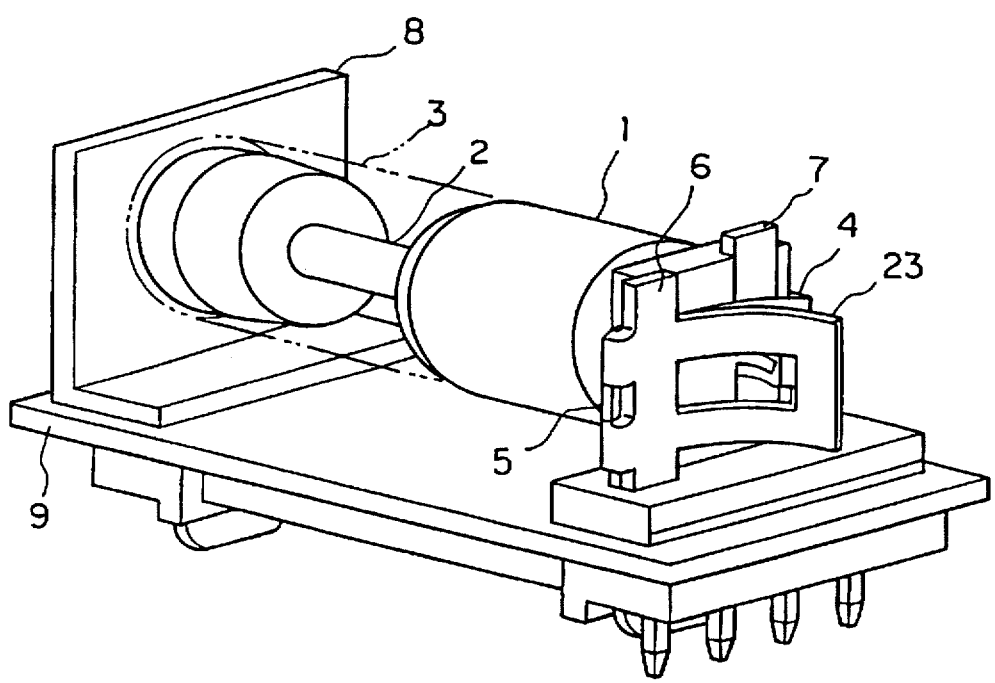
FIG. 14 is a perspective view showing another embodiment of the collision detecting apparatus of the present invention.

FIG. 14 is a perspective view showing the collision detecting apparatus in which a metallic barrier plate 23 as prevention means for preventing plasticity transformation of the movable contact is additionally mounted. In the drawing, reference numeral 23 means the barrier plate mounted on the outside of the movable contact 4 to restrict displacement of the movable contact 4. The barrier plate 23 is provided to have a quadratic curve or a cubic curve such that, when the movable contact 4 contacts the barrier plate 23 at a surface closer to the movable contact 4, the movable contact 4 has an amount of warp corresponding to spring limit, or an amount of warp slightly less than the warp.

Since the barrier plate 23 is mounted, the movable contact 4 is never warped externally with respect to the barrier plate 23 even when excessively large external force is applied to the movable contact 4. As a result, the movable contact 4 is never deformed or plastically deformed, and the spring limit is never exceeded.

Further, the barrier plate 23 is integrally formed with a joint plate 6 so that the number of parts is constant, and easy assembly can be obtained. A structure and an operation other than the above discussion are identical with those in the first embodiment, and descriptions thereof are omitted.

A description will now be given of another embodiment of the collision detecting apparatus of the present invention.

The collision detecting apparatus in the embodiment can be obtained by improving the mass body 1 in the first embodiment.

Figure 15:
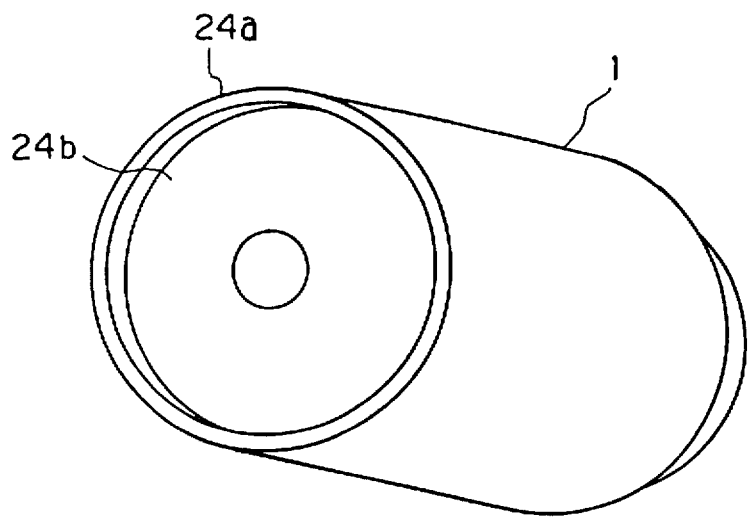
FIG. 15 is a perspective view showing a mass body in another embodiment of the collision detecting apparatus of the present invention.
Figure 16:
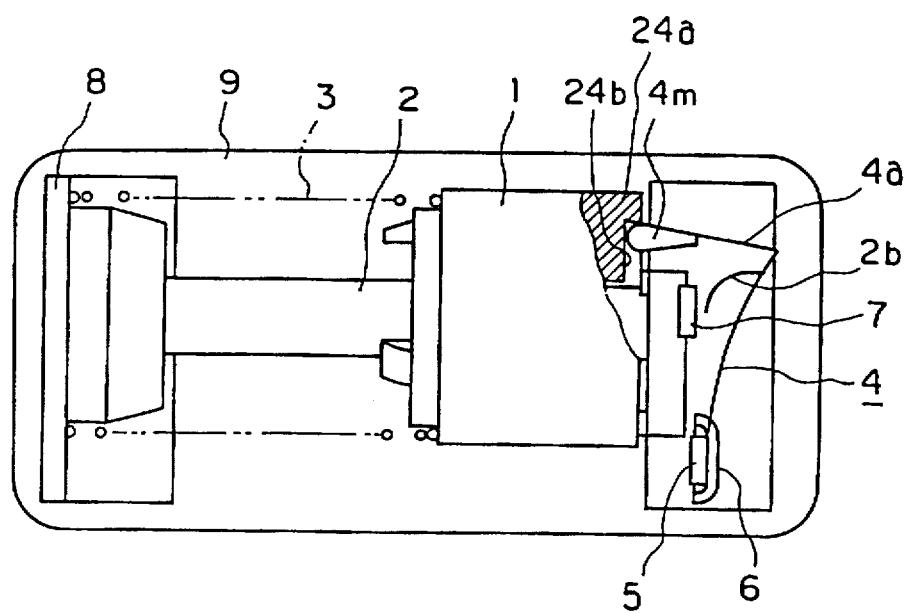
FIG. 16 is a partially broken diagram showing the embodiment in FIG. 15.

FIG. 15 is a perspective view showing the mass body 1 in which an outer wall 24a as a wall portion is additionally mounted around the external portion of the end surface on the side supporting a movable contact. FIG. 16 is a partially broken diagram showing the collision detecting apparatus including the mass body 1. In the drawings, a distal end 4m of a supporting portion 4a of a movable contact 4 is fitted with the inside of the outer wall 24a to contact a bottom portion 24b. Hence, even when the supporting portion 4a of the movable contact 4 is largely elastically deformed, the distal end 4m of the supporting portion 4a is caught by the inside of the outer wall 24a of the mass body 1. Consequently, the distal end 4m of the supporting portion 4a of the movable contact 4 is never moved on the outer peripheral side with respect to the outer wall 24a.

As set forth above, in a normal state, there is not generated such a malfunction that the supporting portion 4a of the movable contact 4 is disengaged from the mass body 1 to bring a contact element 2b into contact with a stationary contact 7. A structure and an operation other than the above discussion are identical with those in the first embodiment, and descriptions thereof are omitted.

A description will now be given of another embodiment of the collision detecting apparatus of the present invention. In the collision detecting apparatus in the embodiment, the inclination of the mass body 1 to the shaft 2 can be overcome.

Figure 17:
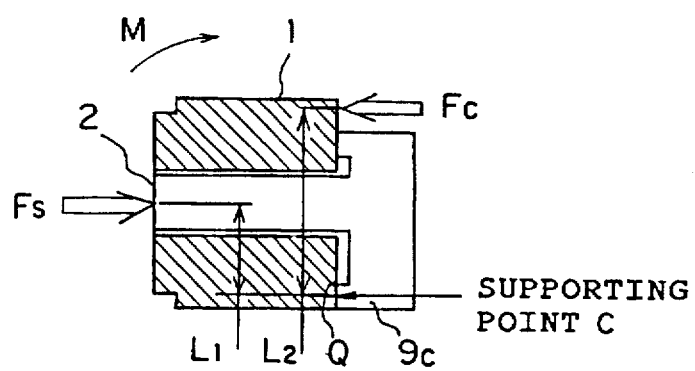
FIG. 17 is an explanatory view showing another embodiment of the collision detecting apparatus of the present invention.

FIG. 17 is an explanatory view showing a relationship between forces applied to the mass body 1. In the drawing, Fs means spring force caused by a coil spring. Fc is force applied from a movable contact. C is a supporting point when the mass body is rotated in a direction of the arrow M in FIG. 17, and L1 and L2 are respective vertical distances to the supporting point C from positions of the mass body 1 to which the forces Fs and Fc are applied. Further, the supporting point C is defined by a position of a contact point Q at which the mass body 1 is in contact with a stop portion 9c. In this case, angular moment M applied to the mass body can be expressed as M=Fs×L1−Fc×L2.

In case L, not shown in FIG. 17, is a distance between the point at which the force Fs is applied and the point at which the force Fc is applied, and L' is a distance between the point at which the force Fc is applied and the supporting point C, the moment M is defined as follows.

$$M=Fs \times L'-Fc \times (L'+L)$$

For M≧0, the mass body 1 can be pressed by the spring force Fs without inclination. This relationship realizes resistance reduce means for reducing friction resistance between the mass body and the shaft on which the mass body slides.

Alternatively, for M<0, the mass body 1 is inclined according to a gap (chattering) between a hole diameter of the mass body 1 and an outer diameter of the shaft 2.

If the collision detecting apparatus is provided to have the smallest size possible, a supporting portion of the movable contact is naturally positioned on the outer peripheral side of the mass body. In this case, a relationship between the vertical distances L1 and L2 can be expressed as L1≈½×L2.

Fs≧2×Fc must be met before M>0 can be held.

However, a value of Fs−Fc can not be made large because of required characteristics of the collision detecting apparatus. Further, in case of excessively small Fc, the contact of the movable contact can not have appropriate contact force so that the chattering is more easily produced.

Therefore, in the embodiment, M≧0 is held in a center axis of the mass body by adjusting the position relationship between the distances L1 and L2, or adjusting magnitude of the forces Fs and Fc.

Further, it is possible to avoid the inclination of the mass body 1 by varying the position of the contact point Q so as to vary a position of the supporting point C. In this case, the supporting point C may typically be positioned at the outermost peripheral portion of the mass body 1. A structure and an operation other than the above discussion are identical with those in the first embodiment, and descriptions thereof are omitted.

A description will now be given of another embodiment of the collision detecting apparatus of the present invention. The embodiment relates to improvement of the mass body 1 in the first embodiment.

Figure 18:
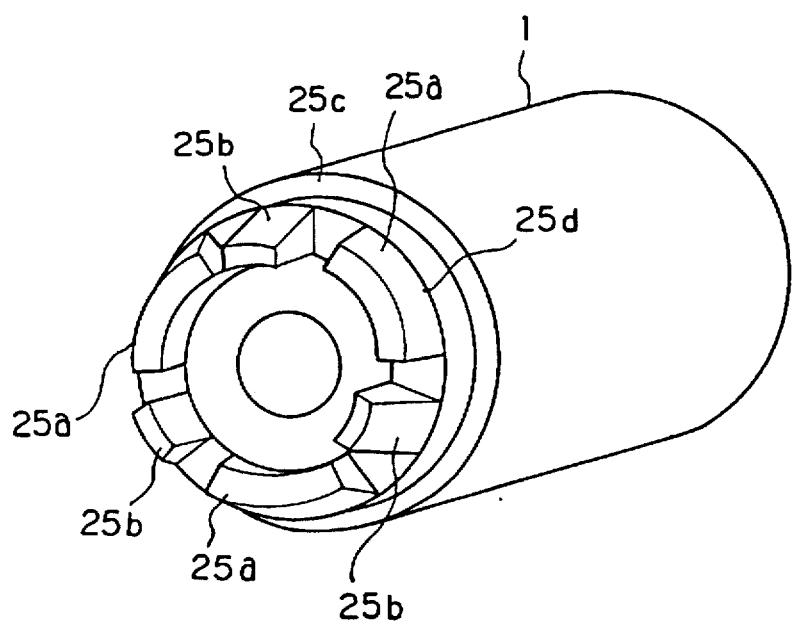
FIG. 18 is a perspective view showing a mass body in another embodiment of the collision detecting apparatus of the present invention.

FIG. 18 is a perspective view showing a mass body 1 including projecting portions 25a having each tapered form to guide a coil spring 3.

In FIG. 18, the guide projecting portions 25a and the impact-absorbing projecting portions 25b are provided to have each tapered form. Further, the guide projecting portions 25a are lower than the adjacent impact-absorbing projecting portions 25b. Heights of the respective projecting portions are set so as to meet the following condition. That is, when deceleration is applied due to collision to bring the mass body 1 into contact with a stopper 8, the impact-absorbing projecting portions 25b initially contact the stopper 8 to sufficiently absorb impact/vibration, and thereafter the guide projecting portions 25a contact the stopper 8.

Further, reference numeral 25c means a spring seat to mount a coil spring 3.

Subsequently, during assembly, when the coil spring 3 is mounted to the spring seat 25c of the mass body 1, the coil spring 3 may not be mounted to the spring seat 25c provided for the mass body 1, but be set on a taper portion 25d of the guide projecting portion 25a. Even in such a case, it is possible to correct a position of the spring 3 so as to correctly introduce the spring 3 onto the spring seat 25c by sliding the spring 3 on a surface of the taper portion 25d. Consequently, it is prevented that the spring is set to other parts than the spring seat 25c as is the correct part to change the characteristic of the collision detecting apparatus. In brief, the spring 3 can always be mounted on a predetermined position as long as the assembly is carried out with such a position accuracy that the spring 3 can be caught by the taper portion 25d of the guide projecting portion 25a.

In the embodiment, the impact-absorbing projecting portions 25b are mounted discretely from the guide projecting portions 25a having the taper portions 25d. However, it must be noted that the impact-absorbing projecting portions 25b may be provided to have tapered forms, and may also serve as the guide projecting portions 25a. A structure and an operation other than the above discussion are identical with those in the first embodiment, and descriptions thereof are omitted.

Figure 19:
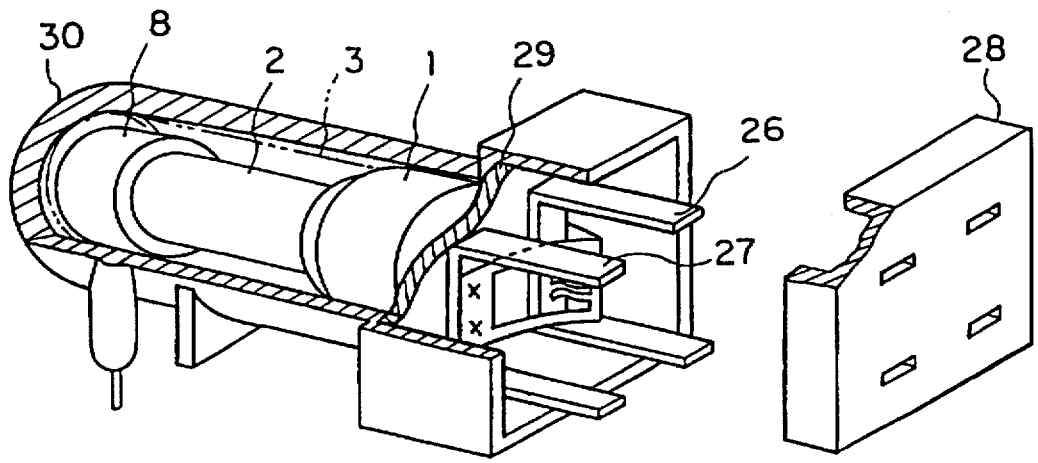
FIG. 19 is a partially broken perspective view showing another embodiment of the collision detecting apparatus of the present invention.
Figure 20:
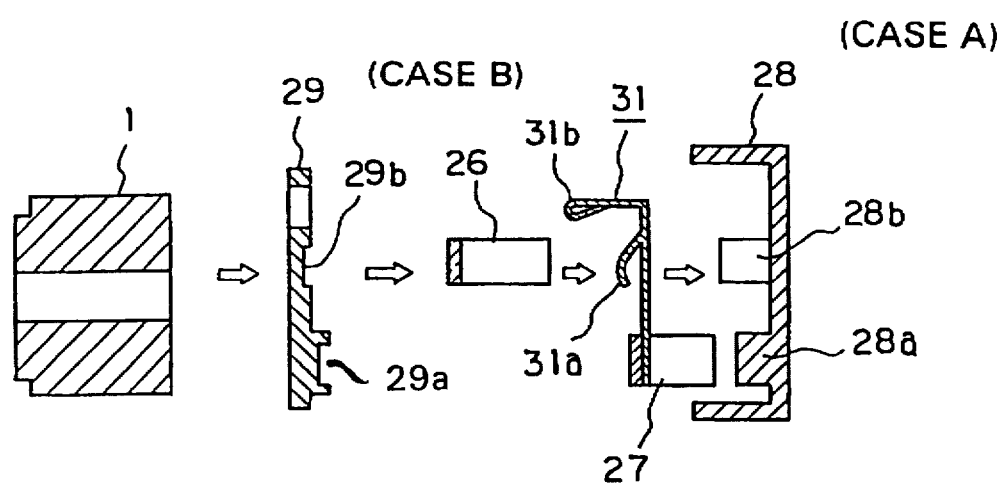
FIG. 20 is an explanatory view showing one embodiment of a method of assembling of a collision detecting apparatus of the present invention.
Figure 21:
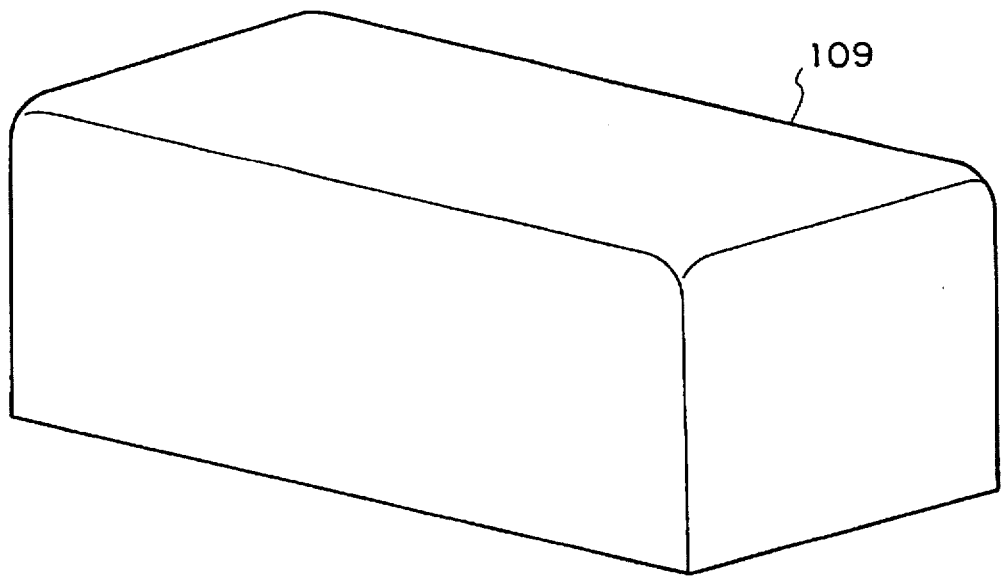
FIG. 21 is a perspective view showing a conventional collision detecting apparatus.
Figure 21:
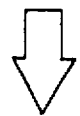
Figure 21:
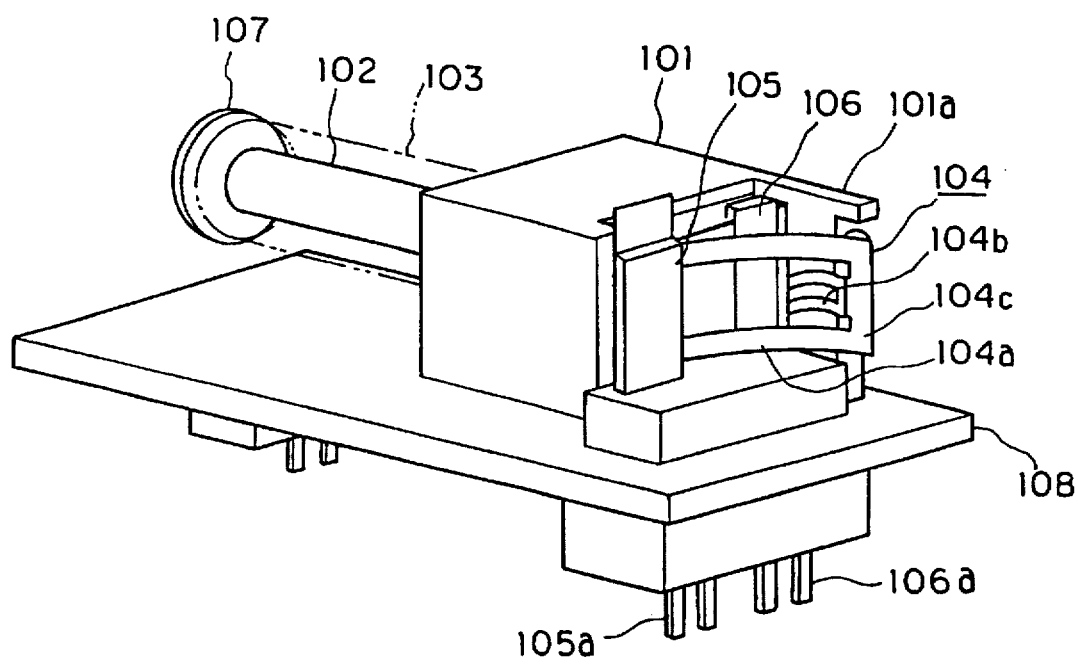

FIG. 19 is a partially broken perspective view showing a method of assembling one embodiment of the collision detecting apparatus of the present invention. FIG. 20 is an exploded view illustrating a partial process of the assembly in detail.

In the drawings, reference numeral 26 means a channel-shaped stationary contact, 27 is a channel-shaped joint side terminal, and 28 is a case A into which the channel-shaped stationary contact 26 and the channel-shaped joint contact 27 can be fixedly inserted with pressure. Further, reference numeral 29 means a case B to support the mass body 1 so as to fix the contacts 26 and 27 in co-operation with the case A, and also serve as a stopper. Reference numeral 30 means a cover into which parts are inserted to be externally protected. In the embodiment, a shaft 2 and a stopper 8 are integrally formed.

According to the embodiment, a description will now be given of an assembling process. FIG. 20 is an exploded sectional view.

The joint side terminal 27 and a movable contact 31 are welded through spot welding or laser welding, and are thereafter fixedly inserted with pressure into the case A 28. Reference numeral 28a means a supporting seat of the movable contact. Subsequently, the stationary contact 26 is fixedly inserted with pressure. Reference numeral 28b means a supporting seat of the stationary contact. The supporting seat 28a and the supporting seat 28b are set to have each different height. Further, a groove 29a and a groove 29b are provided in the case B 29 at positions corresponding to the supporting seats 28a and 28b. When the stationary contact 26 is inserted with pressure, a contact element 31a of the movable contact 31 is in contact with the stationary contact 26, and the movable contact 31 in a free state (in which no force is applied to the movable contact 31) is elastically deformed, resulting in a slightly warped state. In this state, the case A 28 is combined with the case B 29.

With the case A 28 combined with the case B 29, the operation of the movable contact 31 is confirmed by applying force to a supporting portion 31b of the movable contact 31. It is thereby possible to check a switching operation in the apparatus. Further, when the operation of the movable contact 31 is confirmed as set forth above, a traveling condition and force applied to the supporting portion 31b may be quantitatively detected. Thus, it is possible to adjust elastic force of a coil spring 3, or vary weight of a mass body 1 according to the detected force, thereby controlling the apparatus for a predetermined operation.

Next, the mass body 1, the spring 3 (not shown), and the cover 30 (not shown) are sequentially combined. Insertion of the mass body 1 further elastically deforms the movable contact 31 while the mass body 1 pressing the supporting portion 31b of the movable contact 31. Finally, the cover 30 and the case A 28 are secured, resulting in completion of the assembly.

When the movable contact 31 is joined, portions other than the joint portion are in a free state in view of load, and two beam portions of the movable contact 31 are kept in their straight forms. When the stationary contact 26 is inserted with pressure in a subsequent process, the movable contact 31 is in a warped state. With further insertion of the mass body 1, the movable contact 31 is warped to reach a regular amount of warp.

As set forth above, since the joint can be performed in the free state in view of load, joint parts can easily be positioned during the joint. Further, it is possible to reasonably elastically deform the movable contact so as to be in a regularly warped state by forcing or inserting the parts in the subsequent process.

A structure and an operation other than the above discussion are identical with those in the first embodiment, and descriptions thereof are omitted.

As set forth above, the collision detecting apparatus of the present invention can provide many effects as will be described below.

Since the transmission path of vibration transmitted to the contact element through the movable contact is extended, the vibration is effectively reduced before it reaches to the contact element. Consequently, It is prevented that a space between the contact element and the statinary contact varies to change a characteristic of the collision detecting apparatus.

It is possible to extend the transmission path by a simple manner as a hole is formed. In addition. The movable contact is easily transformed owing to an existence of the hole.

Further, in case a cut-raised portion at the one side of the hole is provided with as well as the hole, and the contact element is formed on the cut-raised portion, the transmission path becomes to be longer. In addition, since the length of the contact element becomes to be longer as the cut-raised portion exists, a spring contact becomes to be small so that the vibration is difficult to be transmitted.

It is also possible to extend the transmission path so as to reduce the vibration by a manner that a hole portion is formed on the movable contact and a beam portion crossing the hole portion is formed. In this case, the contact element is easily transformed because it is formed on the beam portion which is easily transformed. As a result, the contact element has a good contact characteristic as it does not generate chattering.

In case the contact portion is formed such that the tip of the contact element is folded, the length of the contact element can be longer than that formed such that a folded part does not exist. Consequently, it can be possible that a spring contact becomes to be small, so that the vibration is difficult to be transmitted. In addition, since the contact part on the contact element with the stationary element is easily transformed, it is difficult to generate chattering.

In case the mass body has a taper portion, the actuation means is easily introduce to the desired place on the mass body, so that the means is easily constructed. In addition, it is prevented that the actuation means is attached to places except for the desired place to change a characteristic of the collision detecting apparatus.

In case a friction resistance between the mass body and the shaft is reduced, so that the mass body slides easily, responsibility of the collision detecting apparatus is improved. In this case, when the shaft is produced, a shaft element having a low friction resistance is easily obtained under a low cost without high working accuracy. Further, if a moment of the force supplied with the mass body is set to predetermined quantity, the mass body does not incline to the shaft on which the mass body slides to reduce a friction resistance.

In case the one end of the movable contact is holed by a plurality of components so as to be fixed to the second stopper, the movable contact is thinned so as to provide effective elastic force without decline of contact strength of the movable contact.

In case the mass body has a wall portion formed around an external edge of the mass body at an end surface facing the second stopper, it is prevented that the movable contact disconnects from the end surface of the mass body while the movable contact contacts with the mass body, so that the collision detecting apparatus functions in error.

In case the first stopper is supported in the support means by means of press fitting, the structure of the stopper is simplified and the stopper is easily constructed.

In case a vibration absorbing component is provided with on the surface of the movable contact, vibration transmitted to the contact element through the movable contact is reduced.

In case the movable contact is bent gradually according to a proceed of assembling of the apparatus, and the final bent quantity is obtained when the assemble is finished, it is prevented that the movable contact is deformed in plastic based on compulsory bending while the apparatus is assembled.

Further, vibration prevention means prevents vibration generated when the mass body collides to the first stopper. Consequently, it is prevented that the vibration is transmitted to the contact point, so that chattering is generated in the contact point which is closed.

In case an elastic second stopper softens a collision of the mass body and the first stopper, the structure of the apparatus is simplified.

In case an elastic buffer member is formed on the first stopper or on the first stopper side of the mass body, a collision of the mass body and the first stopper is softened. In addition, if a taper portion is provided with the elastic buffer member formed on the mass body, the apparatus is more easily assembled and it can be prevented that a characteristic of the apparatus is changed.

In case the characteristic of the actuation means is set to a characteristic of non-linear monotone increase function where an increase ratio of the load becomes larger as the actuation means is compressed, the load of the actuation means is small near the second stopper and is large near the first stopper. Consequently, the collision of the mass body and the first stopper is softened without deterioration of responsibility of the collision detecting apparatus.

In case housing component which is arranged at a predetermined interval with the mass body is provided with, and one end of the housing component is contact with the first stopper, air pressure in a space surrounded by the first stopper, the mass body and the housing component varies as the mass body slides. Since the air pressure prevents movement of the mass body when the mass body approaches to the first stopper, the force softens the collision of the mass body and the first stopper. When the mass body leaves from the first stopper, the force functions to prevent the mass body to move. At the time, the contact point is closed. Thus, a period under closed condition of the contact point is lengthened, so that reliability of the collision detecting apparatus increases.

While preferred embodiments of the invention have been described using specific terms, such description is for illustrative purposes only, and it is to be understood that changes and variations may be made without departing from the spirit or scope of the following claims.

What is claimed is:

1. A collision detecting apparatus comprising:

a mass body having predetermined mass;

a shaft which supports the mass body while said mass body freely slides on the shaft along a predetermined axis direction of said shaft;

a first stopper and a second stopper which support said shaft and stops a slide of the mass body at respective ends of said shaft;

support means for supporting said first stopper and second stopper;

actuation means located between said mass body and said first stopper, for actuating said mass body toward said second stopper;

a stationary contact arranged on said second stopper;

a moveable contact whose one end is fixed to said second stopper and whose other end contacts with said mass body, the movable contact following a slide of said mass body;

a contact element which is arranged on said movable contact, said contact element having a portion folded back over itself such that said folded back portion contacts with said stationary contact; and extension means for extending a transmission path of vibration transmitted to said contact element through said movable contact.

2. A collision detecting apparatus comprising:

a mass body having predetermined mass;

a shaft which supports the mass body while said mass body freely slides on the shaft along a predetermined axis direction of said shaft;

a first stopper and a second stopper which support said shaft and stops a slide of the mass body at respective ends of said shaft;

support means for supporting said first stopper and second stopper;

actuation means located between said mass body and said first stopper, for actuating said mass body toward said second stopper;

a stationary contact arranged on said second stopper;

a moveable contact whose one end is fixed to said second stopper and whose other end contacts with said mass body, the movable contact following a slide of said mass body;

a contact element which is arranged on said movable contact and contacts with said stationary contact; and extension means for extending a transmission path of vibration transmitted to said contact element through said movable contact and a hole portion arranged on the transmission path of the vibration.

3. A collision detecting apparatus according to claim 2, wherein the extension means includes a cut-raised portion formed on one side of the hole portion, and the contact element is arranged on said cut-raised portion.

4. A collision detecting apparatus comprising:

a mass body having predetermined mass;

a shaft which supports the mass body while said mass body freely slides on the shaft along a predetermined axis direction of said shaft;

a first stopper and a second stopper which support said shaft and stops a slide of the mass body at respective ends of said shaft;

support means for supporting said first stopper and second stopper;

actuation means located between said mass body and said first stopper, for actuating said mass body toward said second stopper;

a stationary contact arranged on said second stopper;

a moveable contact whose one end is fixed to said second stopper and whose other end contacts with said mass body, the movable contact following a slide of said mass body;

a contact element which is arranged on said movable contact and contacts with said stationary contact; and extension means for extending a transmission path of vibration transmitted to said contact element through said movable contact and a hole portion formed on the movable contact and a beam portion crossing over said hole portion, and said contact element is arranged on said beam portion.

5. A collision detecting apparatus according to claim 1, wherein the extension means comprises the contact element formed so that a tip of said contact element is turned.

6. A collision detecting apparatus according to claim 1, wherein the mass body includes a tapered portion introducing a actuation means to the end of the mass body where said actuation means faces to the mass body.

7. A collision detecting apparatus according to claim 1, further comprising:

resistance reducing means for reducing friction resistance between the mass body and the shaft.

8. A collision detecting apparatus according to claim 1, wherein the one end of the mass body is held by a plurality of components so as to be fixed to the second stopper when said collision detecting apparatus is in a non-collision mode.

9. A collision detecting apparatus according to claim 1, wherein the mass body has a wall portion formed around an external edge of the mass body at an end surface facing the second stopper.

10. A collision detecting apparatus according to claim 1, wherein the first stopper is supported in the support means by means of press fitting.

11. A collision detecting apparatus according to claim 1, wherein a vibration absorbing component is provided with on a surface of the movable contact.

12. A collision detecting apparatus according to claim 1, further comprising:

prevention means for reducing moving distance of the movable contact when the mass body collides with the second stopper to prevent plasticity transformation of said movable contact.

13. A collision detecting apparatus according to claim 1, wherein the movable contact is formed such that the other end contacts to the second stopper and predetermined bend quantity is provided with by actuating force from the actuation means after the one end is fixed to said second stopper.

14. A collision detecting apparatus comprising:

a mass body having predetermined mass;

a shaft which supports the mass body while said mass body freely slides on the shaft along a predetermined axis direction of said shaft;

a first stopper and a second stopper which support said shaft and stops a slide of the mass body at respective ends of said shaft;

support means for supporting said first stopper and second stopper;

actuation means located between said mass body and said first stopper, for actuating said mass body toward said second stopper;

a stationary contact arranged on said second stopper;

a moveable contact whose one end is fixed to said second stopper and whose other end contacts with said mass body, the movable contact following a slide of said mass body;

a contact element which is arranged on said movable contact, said contact element having a portion folded back over itself such that said folded back portion contacts with said stationary contact; and vibration prevention means for preventing vibration generated when the mass body collides with the first stopper.

15. A collision detecting apparatus according to claim 14, wherein the vibration prevention means is formed of the first stopper made of elastic material.

16. A collision detecting apparatus comprising:

a mass body having predetermined mass;

a shaft which supports the mass body while said mass body freely slides on the shaft along a predetermined axis direction of said shaft;

a first stopper and a second stopper which support said shaft and stops a slide of the mass body at respective ends of said shaft;

support means for supporting said first stopper and second stopper;

actuation means located between said mass body and said first stopper, for actuating said mass body toward said second stopper;

a stationary contact arranged on said second stopper;

a moveable contact whose one end is fixed to said second stopper and whose other end contacts with said mass body, the movable contact following a slide of said mass body;

a contact element which is arranged on said movable contact and contacts with said stationary contact; and vibration prevention means for preventing vibration generated when the mass body collides with the first stopper, wherein the vibration prevention means comprises an elastic buffer member formed on the first stopper or on the first stopper side of the mass body.

17. A collision detecting apparatus comprising:

a mass body having predetermined mass;

a shaft which supports the mass body while said mass body freely slides on the shaft along a predetermined axis direction of said shaft;

a first stopper and a second stopper which support said shaft and stops a slide of the mass body at respective ends of said shaft;

support means for supporting said first stopper and second stopper;

actuation means located between said mass body and said first stopper, for actuating said mass body toward said second stopper;

a stationary contact arranged on said second stopper;

a moveable contact whose one end is fixed to said second stopper and whose other end contacts with said mass body, the movable contact following a slide of said mass body;

a contact element which is arranged on said movable contact and contacts with said stationary contact; and vibration prevention means for preventing vibration in said movable contact generated when said mass body collides with said first stopper, wherein the vibration prevention means is formed of the actuation means having a load characteristic of non-linear monotone increase function where an increase ratio of the load becomes larger as the actuation means is compressed.

18. A collision detecting apparatus according to claim 14, wherein the vibration prevention means comprises a cylindrical housing component which is arranged at a predetermined interval with the mass body, and one end of said housing component is contact with the first stopper.

19. A collision detecting apparatus according to claim 14, wherein the mass body includes a tapered portion introducing the actuation means to a end of the mass body where said actuation means faces to the mass body.

20. A collision detecting apparatus according to claim 14, further comprising:

resistance reduce means for reducing friction resistance between the mass body and the shaft.

21. A collision detecting apparatus according to claim 14, wherein the one end of the mass body is held by a plurality of components so as to be fixed to the second stopper when said collision detecting apparatus is in a non-collision mode.

22. A collision detecting apparatus comprising:

a mass body having predetermined mass;

a shaft which supports the mass body while said mass body freely slides on the shaft along a predetermined axis direction of said shaft;

a first stopper and a second stopper which support said shaft and stops a slide of the mass body at respective ends of said shaft;

support means for supporting said first stopper and second stopper;

actuation means located between said mass body and said first stopper, for actuating said mass body toward said second stopper;

a stationary contact arranged on said second stopper;

a moveable contact whose one end is fixed to said second stopper and whose other end contacts with said mass body, the movable contact following a slide of said mass body;

a contact element which is arranged on said movable contact and contacts with said stationary contact; and vibration prevention means for preventing vibration generated when the mass body collides with the first stopper wherein the mass body has a wall portion formed around an external edge of the mass body at an end surface facing the second stopper to hold said movable contact during a non-collision mode.

23. A collision detecting apparatus according to claim 14, wherein the first stopper is supported in the support means by means of press fitting.

24. A collision detecting apparatus according to claim 14, wherein a vibration absorbing component is provided with on a surface of the movable contact.

25. A collision detecting apparatus according to claim 14, further comprising:

prevention means for reducing moving distance of the movable contact when the mass body collides with the second stopper to prevent plasticity transformation of said movable contact.

26. A collision detecting apparatus according to claim 14, wherein the movable contact is formed so that the another end contacts to the second stopper and predetermined bend quantity is provided with by actuating force from the actuation means after the one end is fixed to said second stopper.

27. A collision detecting apparatus according to claim 1, wherein the extension means comprises a hole portion arranged on the transmission path of the vibration.

28. A collision detecting apparatus according to claim 1, wherein the extension means comprises a hole portion formed on the movable contact and a beam portion crossing over said hole portion, and the contact element is arranged on said beam portion.

29. A collision detecting apparatus comprising:

a mass body having predetermined mass;

a shaft which supports the mass body while said mass body freely slides on the shaft along a predetermined axis direction of said shaft;

a first stopper and a second stopper which support said shaft and stops a slide of the mass body at respective ends of said shaft;

support means for supporting said first stopper and second stopper;

actuation means located between said mass body and said first stopper, for actuating said mass body toward said second stopper;

a stationary contact arranged on said second stopper;

a moveable contact whose one end is fixed to said second stopper and whose other end contacts with said mass body, the movable contact following a slide of said mass body;

a contact element which is arranged on said movable contact and contacts with said stationary contact, said contact element extending downward from said movable contact in a direction of said support means; and extension means for extending a transmission path of vibration transmitted to said contact element through said movable contact.

30. A collision detecting apparatus according to claim 1, wherein a cover piece seals said collision detecting apparatus and said actuation means comprises a volume of air sealed inside said collision detecting apparatus.

* * * * *